(12) United States Patent
Yin et al.

(10) Patent No.: US 7,705,572 B2
(45) Date of Patent: Apr. 27, 2010

(54) POWER SUPPLY DEVICE AND PROJECTION APPARATUS USING THE SAME

(75) Inventors: Nan-Jiun Yin, Miao-Li (TW); Yen-Hsien Su, Miao-Li (TW)

(73) Assignee: Coretronic Corporation, Hsinchu (TW)

( * ) Notice: Subject to any disclaimer, the term of this patent is extended or adjusted under 35 U.S.C. 154(b) by 439 days.

(21) Appl. No.: 11/808,153

(22) Filed: Jun. 7, 2007

(65) Prior Publication Data
US 2008/0042630 A1 Feb. 21, 2008

(30) Foreign Application Priority Data
Aug. 15, 2006 (TW) .............................. 95129997 A

(51) Int. Cl.
*G05F 1/00* (2006.01)
(52) U.S. Cl. .................... 323/273; 323/276
(58) Field of Classification Search ................. 323/217, 323/223, 224, 226, 238, 266, 269, 270, 271, 323/276, 273, 281
See application file for complete search history.

(56) References Cited

U.S. PATENT DOCUMENTS

| | | | | |
|---|---|---|---|---|
| 4,008,418 A | * | 2/1977 | Murphy | 361/18 |
| 5,828,204 A | * | 10/1998 | Jansen | 323/266 |
| 5,847,552 A | * | 12/1998 | Brown | 323/281 |
| 7,276,885 B1 | * | 10/2007 | Tagare | 323/267 |

FOREIGN PATENT DOCUMENTS

| TW | 272301 | 8/2005 |
|---|---|---|
| TW | 200616324 A | 5/2006 |

* cited by examiner

*Primary Examiner*—Bao Q Vu
*Assistant Examiner*—Nguyen Tran
(74) *Attorney, Agent, or Firm*—Bacon & Thomas, PLLC

(57) ABSTRACT

A projection apparatus comprises a projection control unit, power supply device and fan. The projection control unit generates an image beam. The power supply device comprises a filter and voltage driving unit. The voltage driving unit is coupled to the filter and comprises a voltage-regulation feedback unit and current amplification component. The filter receives a PWM signal and accordingly outputting a first DC voltage. The voltage-regulation feedback unit receives the first DC voltage and outputs a second DC voltage. The current amplification component is coupled to the voltage-regulation feedback unit for receiving an operational voltage and the second DC voltage, current-amplifying the second DC voltage, and accordingly outputting a driving voltage, which is fed back to the voltage-regulation feedback unit. The voltage-regulation feedback unit regulates the driving voltage according to the first DC voltage. The fan receives the driving voltage for releasing heat of the projection control unit.

16 Claims, 2 Drawing Sheets

POWER SUPPLY DEVICE AND PROJECTION APPARATUS USING THE SAME

This application claims the benefit of Taiwan application Serial No. 95129997, filed Aug. 15, 2006, the subject matter of which is incorporated herein by reference.

BACKGROUND OF THE INVENTION

1. Field of the Invention

The invention relates in general to a power supply device and projection apparatus using the same, and more particularly to a power supply device which regulates voltage by using a voltage-regulation feedback unit or has a protection device, and projection apparatus using the same.

2. Description of the Related Art

The projection apparatus normally uses a fan for releasing heat such that the inner system has a normal operation under suitable environmental temperature. Whether the fan stably operates is related to a power supply device in the projection apparatus.

Referring to FIG. 1, a partial circuit diagram of a conventional projection apparatus is shown. A projection apparatus 100 includes a power supply device 110, a fan 120, and a projection control unit 130. The projection control unit 130 is for generating an image beam. The power supply device 110 includes a bipolar junction transistor (BJT) M1, a metal oxide semiconductor (MOS) transistor M2 and a filter 112. The filter 112 is a LC filter for instance. The transistor M1 has an emitter coupled to a ground voltage, and a collector coupled to an operational voltage Vdd, such as 13V. The MOS transistor M2 has a gate coupled to the collector of the transistor M1, a drain coupled to the operational voltage Vdd and a source coupled to the filter 112. The fan 120 is coupled to the filter 112 and is used for releasing heat of the projection control unit 130.

As shown in FIG. 1, a pulse width modulation (PWM) signal is inputted to a base of the transistor M1 and the transistor M1 performs a power amplification operation on the PWM signal according to the operational voltage Vdd to generate a square-wave voltage Vin. The square-wave voltage Vin is current-amplified via the MOS transistor M2 to generate a voltage Vc, which is inputted to the filter 112. The filter 112 filters out a alternating-current (AC) component of the voltage Vc and accordingly outputs a direct-current (DC) voltage Vout for driving the fan 120. The air flow generated by the fan 120 releases heat of the projection control unit 130 outside the projection apparatus 100 and thus cool down the projection apparatus 100.

However, the operational voltage Vdd coupled to the power supply device 110 has normally 10% variation, which causes a large variation of the DC voltage Vout. As a result, the fan 120 generates loud noise due to rotating too fast or cannot effectively release heat of the projection apparatus 100 due to rotating too slow. Besides, the filter 112 is easily affected by loading on a subordinate circuits, such as the fan 120, and consequently, ripples are generated on waveform of the DC voltage Vout, which causes an unstable operation of the fan 120.

On the other hand, if the subordinate circuit of the power supply device 110 has shortcut situation, such as shortcut of a motor coil of the fan 120, the power supply device 110 without a shortcut protection device to stop an instant large current generated due to the circuit shortcut damages its inner circuit devices.

SUMMARY OF THE INVENTION

The invention is directed to a power supply device and projection apparatus using the same. The power supply device regulates a driving voltage of the fan by using a voltage-regulation feedback unit to maintain a stable operation of the fan. Besides, the power supply device has a protection device. When the subordinate circuits of the power supply device have shortcut situation and generate a large current to flow into the projection device, the projection device stops the large current to protect the power supply device. Therefore, not only the power supply device is protected from damage but also the stability of the output voltage is improved.

According to a first aspect of the present invention, a power supply device is provided. The power supply device comprises a filter and a voltage driving unit. The filter is for receiving a pulse width modulation (PWM) signal and accordingly outputting a first direct-current (DC) voltage. The voltage driving unit is coupled to the filter and comprises a voltage-regulation feedback unit and a current amplification component. The voltage-regulation feedback unit is for receiving the first DC voltage and accordingly outputting a second DC voltage. The current amplification component is coupled to the voltage-regulation feedback unit for receiving an operational voltage and the second DC voltage, performing a current amplification operation on the second DC voltage, and accordingly outputting a driving voltage. The driving voltage is fed back to the voltage-regulation feedback unit. The voltage-regulation feedback unit regulates the driving voltage fed back to the voltage-regulation feedback unit according to the first DC voltage.

According to a second aspect of the present invention, a projection apparatus is provided. The projection apparatus comprises a projection control unit, a power supply device and a fan. The projection control unit is for generating an image beam. The power supply device is coupled to the projection control unit and comprises a filter and a voltage driving unit. The filter is for receiving a PWM signal and accordingly outputting a first DC voltage. The voltage driving unit is coupled to the filter and comprises a voltage-regulation feedback unit and a current amplification component. The voltage-regulation feedback unit, for receiving the first DC voltage and accordingly outputting a second DC voltage. The current amplification component is coupled to the voltage-regulation feedback unit for receiving an operational voltage and the second DC voltage, performing a current amplification operation on the second DC voltage, and accordingly outputting a driving voltage. The driving voltage is fed back to the voltage-regulation feedback unit. The fan is for receiving the driving voltage and accordingly releasing heat of the projection control unit. The voltage-regulation feedback unit regulates the driving voltage fed back to the voltage-regulation feedback unit according to the first DC voltage.

According to a third aspect of the present invention, a projection apparatus is provided. The projection apparatus comprises a projection control unit, a power supply device, and a fan. The projection control unit is for generating an image beam. The power supply device is coupled to the projection control unit and comprises a filter, a voltage driving unit, and a protection device. The filter is for receiving a PWM signal and accordingly outputting a first DC voltage. The voltage driving unit is coupled to the filter for receiving an operational voltage. The voltage driving unit is for performing a current amplification operation on the first DC voltage and accordingly outputting a driving voltage. The protection device is coupled to the voltage driving unit. When a large current flows into the protection device via the voltage driving unit, the protection device disables the voltage driving unit. The fan is for receiving the driving voltage and accordingly releasing heat of the projection control unit.

Other objectives, features and advantages of the present invention will be further understood from the further technology features disclosed by the embodiments of the present invention wherein there are shown and described preferred embodiments of this invention, simply by way of illustration of modes best suited to carry out the invention.

DETAILED DESCRIPTION OF THE INVENTION

It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

Figure 1:
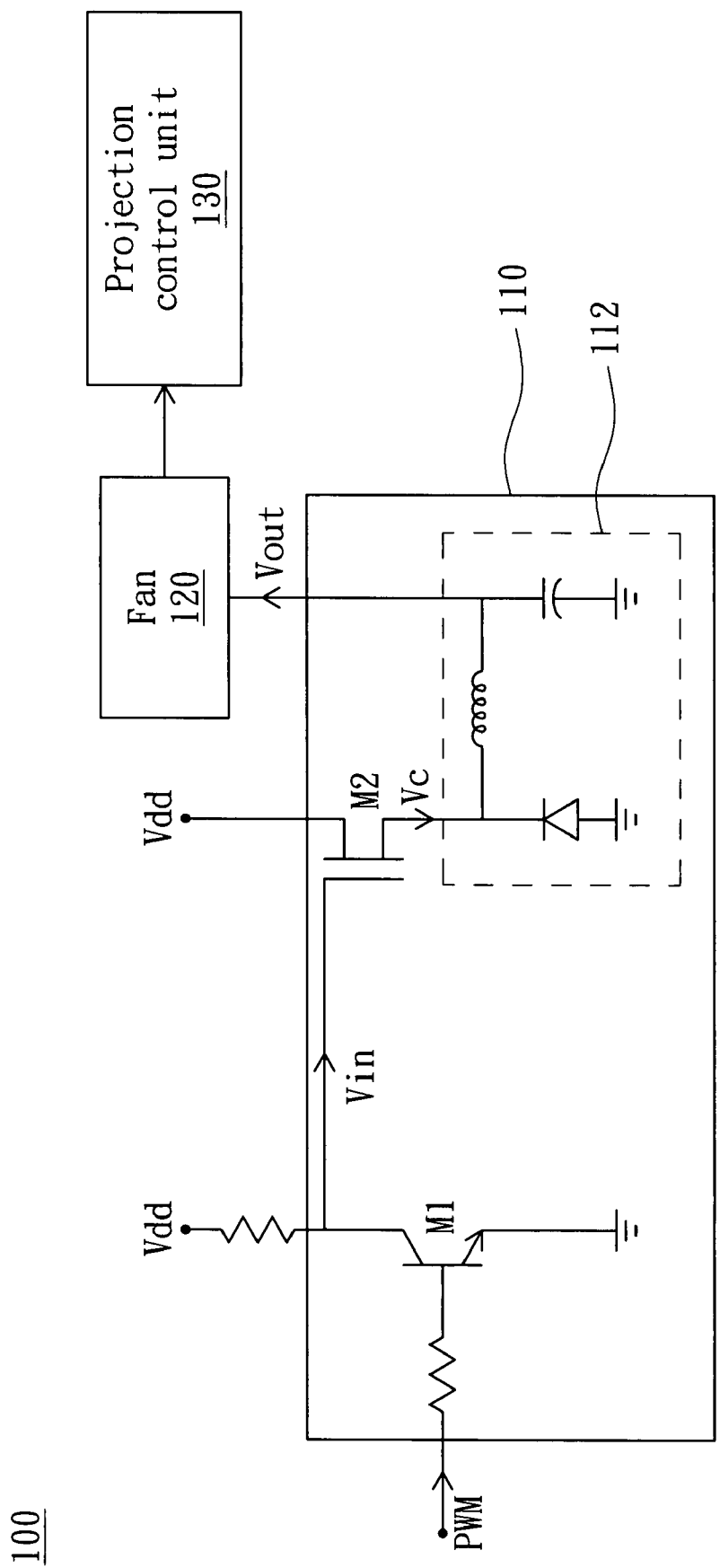
FIG. 1 is a partial circuit diagram of a conventional projection apparatus.
Figure 2:
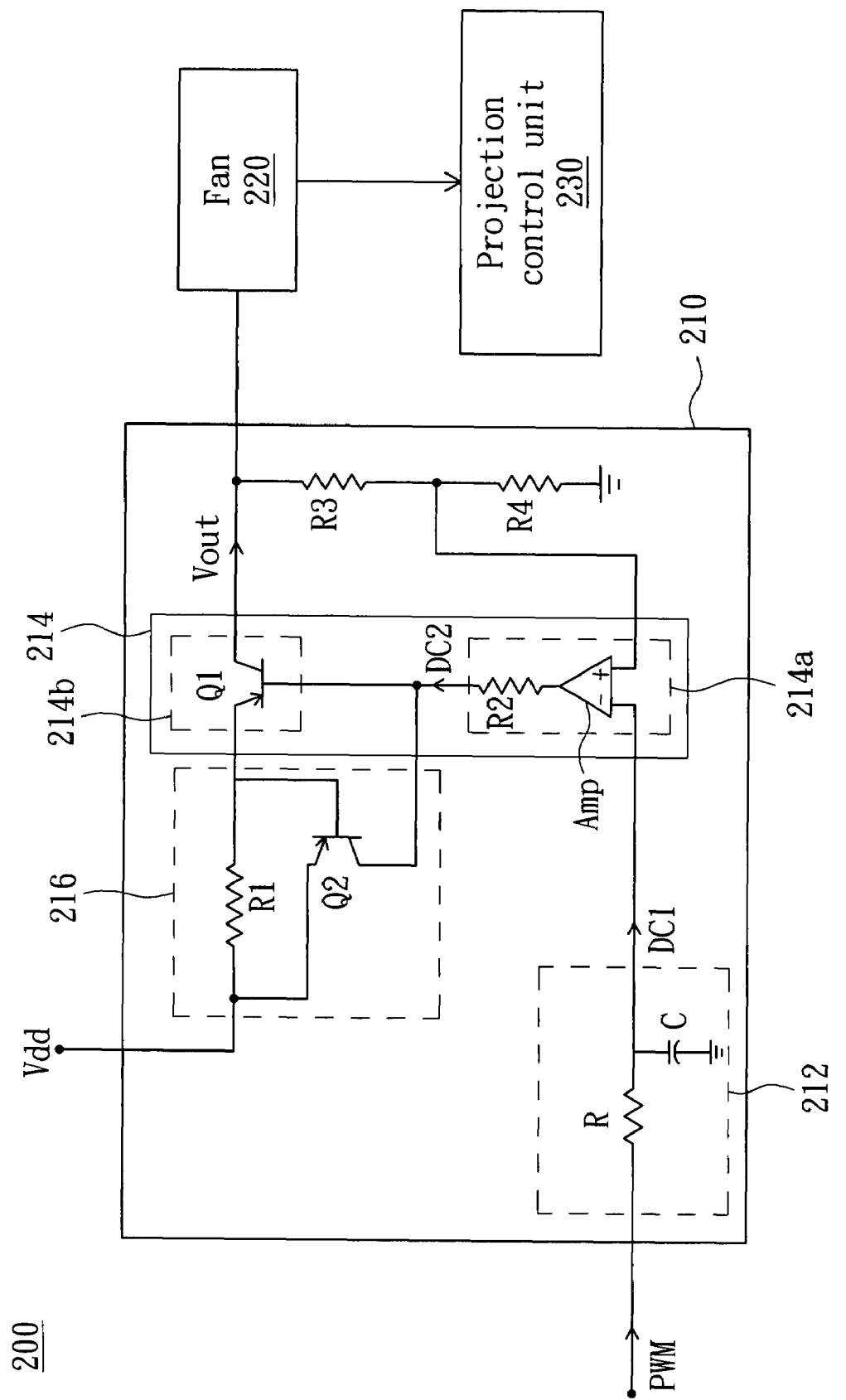
FIG. 2 is a circuit diagram of a projection apparatus according to a preferred embodiment of the invention.

Referring to FIG. 2, a circuit diagram of a projection apparatus according to a preferred embodiment of the invention is shown. A projection apparatus 200 includes a power supply device 210, a fan 220 and a projection control unit 230. The projection control unit 230 is for generating an image beam and the power supply device 210 includes a filter 212, a voltage driving unit 214 and a protection device 216. The filter 212 is generally a resistor-capacitor (RC) filter or inductor-capacitor (LC) filter for receiving a pulse width modulation (PWM) signal and accordingly outputting a first direct-current (DC) voltage DC1. The filter 212 is exemplified to be a RC filter in FIG. 2. The voltage driving unit 214 is coupled to the filter 212 and includes a voltage-regulation feedback unit 214a and current amplification component 214b. The voltage-regulation feedback unit 214a is for receiving the first DC voltage DC1 and accordingly outputting a second DC voltage DC2. The current amplification component 214b is coupled to the voltage-regulation feedback unit 214a. When the power supply device 210 operates normally, the current amplification component 214b receives an operational voltage Vdd via the protection device 216 and the second DC voltage DC2, performs a current amplification operation on the second DC voltage DC2, and accordingly outputs a driving voltage Vout for driving the fan 220. The air flow generated by the fan 220 releases heat of the projection control unit 230 out of the projection apparatus 200. For example, the projection control unit 230 comprises a optical engine module, micro-processor or control circuit board. The protection device 216 is coupled between the operational voltage Vdd and voltage driving unit 214. When a large current flows into the protection device 216 via the voltage driving unit 214, the protection device 216 disables the voltage driving unit 214 to stop the large current and protect inner circuits of the power supply device from damage.

Besides, the driving voltage Vout is fed back to the voltage-regulation feedback unit 214a via resistance components R3 and R4. The voltage-regulation feedback unit 214a regulates the driving voltage Vout which is fed back to the voltage-regulation feedback unit 214a according to the first DC voltage DC1. In the embodiment, the voltage-regulation feedback unit 214a regulates the driving voltage Vout by using high resistance feature of an input terminal of an operation amplifier (Op-Amp). A non-inverse input terminal and an inverse input terminal of the Op-Amp are respectively coupled to the driving voltage Vout and the first DC voltage DC1. According to a feedback principle, a voltage difference of the driving voltage Vout and first DC voltage DC1 has a small variation, which is normally about 50 mV. The first DC voltage DC1 is subtly controlled by adjusting the PWM signal. Therefore, the driving voltage Vout outputted by the power supply device 210 to the fan 220 is not largely shifted due to variation of the operational voltage Vdd, which achieves the purpose of voltage regulation. At the same time, the high input resistance feature of the Op Amp lessens the influence of the loading of subordinate circuits, such as the fan 220, upon the filter 212, which helps to reduce ripples of the driving voltage Vout and thus an error value of the fan voltage.

On the other hand, as shown in FIG. 2, the current amplification component 214b is, for example, a first pnp-type bipolar junction transistor (BJT) Q1, and the first pnp-type BJT Q1 has an emitter coupled to the operational voltage Vdd via the protection device 216, a base coupled to a second DC voltage DC2 and a collector for outputting the driving voltage Vout. The protection device 216 includes a resistance component R1 and a second pnp-type BJT Q2. The resistance component R1 is coupled between the operational voltage Vdd and the emitter of the first pnp-type BJT Q1. The resistance component R1 is, for example, a constant resistor, which has a resistance of about 1Ω. The second pnp-type BJT Q2 has an emitter coupled to the operational voltage Vdd, a base coupled to the emitter of the first pnp-type BJT Q1, and a collector coupled to the base of the first pnp-type BJT Q1.

Under a normal operation, that is, there is not a large current flowing to the protection device 216 via the current amplification component 214b of the voltage driving unit 214, the first pnp-type BJT Q1 is turned on by the second DC voltage DC2 with a low level voltage while the voltage difference between the base and emitter of the second pnp-type BJT Q2 does not exceed a threshold voltage, and thus the second pnp-type BJT Q2 is in a cut-off region and turned off. Accordingly, the turned-on first pnp-type BJT Q1 current-amplifies the second DC voltage DC2 according to the operational voltage Vdd and then outputs the driving voltage Vout. The fan 220 receives the driving voltage Vout to do the required operation.

When the fan 220 and power supply device 210 are connected by a way of inversing the position and negative poles, or the fan 220 has a short circuit, the fan 220 generates a large current (more than 0.6 A), and the large current flows into the resistance component R1 of the protection device 216 via the current amplification component 214b. At the time, the voltage drop across the resistance component R1 is more than 0.6V(=1Ω×0.6 A) and because the emitter voltage of the second pnp-type BJT Q2 is higher than its base voltage by more than a threshold voltage, the second pnp-type BJT Q2 enters a saturation region to turn on. The turned-on second pnp-type BJT Q2 has an emitter voltage (Vdd) being about 0.2V higher than a collector voltage, that is, the second pnp-type BJT Q2 has a collector voltage about Vdd−0.2V. As shown in FIG. 2, the emitter voltage of the first pnp-type BJT Q1 is about Vdd−0.6V and the base voltage of the first pnp-type BJT Q1 is equal to the collector voltage (=Vdd−0.2V) of the second pnp-type BJT Q2. Therefore, the turned-on second pnp-type BJT Q2 reduces the voltage difference (=(Vdd−0.6V)−(Vdd−0.2V)=−0.4V) between the emitter and base of the first pnp-type BJT Q1 to be lower than the threshold voltage and thus the first pnp-type BJT Q1 enters a cut-off region to turn off. By doing this, the protection device 216 stop the voltage driving unit 214 from outputting the driving voltage Vout and thus stops the large current from flowing into the power supply device 210, which achieves the purpose of protecting the power supply device 210. Of course, the resistance component R1 is adjusted to have different constant resistance as needed in order to adjust sensitivity of the protection device 216.

As mentioned above, although the power supply device 210 is exemplified by the example including the voltage-regulation feedback unit 214a and protection device 216 for illustration in the invention, the power supply device 210 of the invention also uses only the voltage-regulation feedback unit 214a and the current amplification component 214b to regulate the output voltage Vout or use only the protection device 216 and current amplification component 214b to prevent the large current from being inputted into and then damaging the inner components. Moreover, the protection device 216 is also not limited to including the above resistance component R1 and second pnp-type BJT Q2. As long as the power supply device uses a voltage-regulation feedback unit to regulate the output voltage in a way of voltage feedback or uses a protection device to disable the current amplification component as a large current flows into the current amplification component to achieve the purpose of regulating the output voltage or protecting the power supply device, all the alternatives do not depart from the scope of the invention.

The power supply device and projection apparatus using the same disclosed by the above embodiment of the invention uses a voltage-regulation feedback unit in power supply device to regulate the voltage for driving the fan according to a voltage feedback principle to achieve the purpose of stabilizing an operation of the fan. Besides, the power supply device has a protection device. When the subordinate circuits of the power supply device have shortcut situation, and the large current generated flows into the protection device via the voltage driving unit, the protection device disables the voltage driving unit to stop the large current from continuously flowing in and damaging the inner circuit of the power supply device to achieve the purpose of protecting the power supply device.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A power supply device, comprising:
   a filter, for receiving a pulse width modulation signal and accordingly outputting a first direct-current voltage; and
   voltage driving unit, coupled to the filter, the voltage driving unit comprising:
   a voltage-regulation feedback unit, for receiving the first direct-current voltage and accordingly outputting a second direct-current voltage; and
   current amplification component, coupled to the voltage-regulation feedback unit for receiving an operational voltage and the second direct-current voltage, performing a current amplification operation on the second direct-current voltage, and accordingly outputting a driving voltage, wherein the driving voltage is fed back to the voltage-regulation feedback unit; wherein the voltage-regulation feedback unit regulates the driving voltage fed back to the voltage-regulation feedback unit according to the first direct-current voltage; and
   wherein the current amplification component is a first pnp-type bipolar junction transistor and the power supply device further comprises a protection device coupled to the current amplification component, the protection device comprises a resistance component and a second pnp-type bipolar junction transistor, the resistance component is coupled between the operational voltage and an emitter of the first pnp-type bipolar junction transistor, the second pnp-type bipolar junction transistor has an emitter coupled to the operational voltage, a base coupled to the emitter of the first pnp-type bipolar junction transistor, and a collector coupled to a base of the first pnp-type bipolar junction transistor, and a collector of the first pnp-type bipolar junction transistor outputs the driving voltage;
   wherein when a large current flows into the resistance component via the current amplification component, the second pnp-type bipolar junction transistor enters a saturation region to turn on for the first pnp-type bipolar junction transistor entering a cut-off region to turn off.

2. The power supply device according to claim 1, wherein the filter is a resistor-capacitor filter or inductor-capacitor filter.

3. The power supply device according to claim 1, wherein the driving voltage regulated by the voltage-regulation feedback unit is substantially equal to the first direct-current voltage.

4. The power supply device according to claim 3, wherein the voltage-regulation feedback unit is implemented by using an operation amplifier.

5. The power supply device according to claim 4, wherein a non-inverse input terminal and an inverse input terminal of the operation amplifier are respectively coupled to the driving voltage and the first direct-current voltage.

6. The power supply device according to claim 1, wherein the current amplification component is a first pnp-type bipolar junction transistor, and the first pnp-type bipolar junction transistor has an emitter coupled to the operational voltage, a collector for outputting the driving voltage and a base coupled to the second direct-current voltage;

wherein the voltage-regulation feedback unit outputs the second direct-current voltage to turn on the first pnp-type bipolar junction transistor for the first pnp-type bipolar junction transistor outputting the driving voltage according to the operational voltage.

7. The power supply device according to claim 1, wherein the driving voltage is for driving at least a fan of a projection apparatus.

8. A projection apparatus, comprising: a projection control unit, for generating an image beam;
a power supply device, coupled to the projection control unit, comprising:
a filter, for receiving a pulse width modulation signal and accordingly outputting a first direct-current voltage; and
voltage driving unit, coupled to the filter, the voltage driving unit comprising:
a voltage-regulation feedback unit, for receiving the first direct-current voltage and accordingly outputting a second direct-current voltage; and
current amplification component, coupled to the voltage-regulation feedback unit for receiving an operational voltage and the second direct-current voltage, performing a current amplification operation on the second direct-current voltage, and accordingly outputting a driving voltage, wherein the driving voltage is fed back to the voltage-regulation feedback unit; and
fan, for receiving the driving voltage and accordingly releasing heat of the projection control unit;
wherein the voltage-regulation feedback unit regulates the driving voltage fed back to the voltage-regulation feedback unit according to the first direct-current voltage; and
wherein the current amplification component is a first pnp-type bipolar junction transistor and the power supply device further comprises a protection device coupled to the current amplification component, the protection device comprises a resistance component and a second pnp-type bipolar junction transistor, the resistance component is coupled between the operational voltage and an emitter of the first pnp-type bipolar junction transistor, the second pnp-type bipolar junction transistor has an emitter coupled to the operational voltage, a base coupled to the emitter of the first pnp-type bipolar junction transistor, and a collector coupled to a base of the first pnp-type bipolar junction transistor, and a collector of the first pnp-type bipolar junction transistor outputs the driving voltage;
wherein when a lame current flows into the resistance component via the current amplification component, the second pnp-type bipolar junction transistor enters a saturation region to turn on for the first pnp-type bipolar junction transistor entering a cut-off region to turn off.

9. The projection apparatus according to claim 8, wherein the filter is a resistor-capacitor filter or inductor-capacitor filter.

10. The projection apparatus according to claim 8, wherein the driving voltage regulated by the voltage-regulation feedback unit is substantially equal to the first direct-current voltage.

11. The projection apparatus according to claim 10, wherein the voltage-regulation feedback unit is implemented by using an operation amplifier.

12. The projection apparatus according to claim 11, wherein a non-inverse input terminal and an inverse input terminal of the operation amplifier are respectively coupled to the driving voltage and the first direct-current voltage.

13. The projection apparatus according to claim 8, wherein the current amplification component is a first pnp-type bipolar junction transistor, and the first pnp-type bipolar junction transistor has an emitter coupled to the operational voltage, a collector for outputting the driving voltage and a base coupled to the second direct-current voltage;

wherein the voltage-regulation feedback unit outputs the second direct-current voltage to turn on the first pnp-type bipolar junction transistor for the first pnp-type bipolar junction transistor outputting the driving voltage according to the operational voltage.

14. A projection apparatus, comprising:
a projection control unit, for generating an image beam;
a power supply device, coupled to the projection control unit, comprising:
a filter, for receiving a pulse width modulation signal and accordingly outputting a first direct-current voltage; and
voltage driving unit, coupled to the filter for receiving an operational voltage, wherein the voltage driving unit is for performing a current amplification operation and accordingly outputting a driving voltage; and
protection device, coupled to the voltage driving unit, wherein when a large current flows into the protection device via the voltage driving unit, the protection device disables the voltage driving unit; and fan, for receiving the driving voltage and accordingly releasing heat of the projection control unit; and
wherein the voltage driving unit comprises a first pnp-type bipolar junction transistor, a collector of the first pnp-type bipolar junction transistor outputs the driving voltage, a base of the first pnp-type bipolar junction transistor is coupled to the filter, the protection device comprises a resistance component and a second pnp-type bipolar junction transistor, the resistance component is coupled between the operational voltage and an emitter of the first pnp-type bipolar junction transistor, the second pnp-type bipolar junction transistor has an emitter coupled to the operational voltage, a base coupled to the emitter of the first pnp-type bipolar junction transistor, and a collector coupled to a base of the first pnp-type bipolar junction transistor;
wherein when the large current flows into the resistance component via the first pnp-type bipolar junction transistor, the second pnp-type bipolar junction transistor enters a saturation region to turn on such that the first pnp-type bipolar junction transistor entering a cut-off region to turn off.

15. The projection apparatus according to claim 14, wherein the filter is a resistor-capacitor filter or inductor-capacitor filter.

16. The projection apparatus according to claim 14, wherein the voltage driving unit comprises a voltage-regulation feedback unit and a current amplification component, the voltage-regulation feedback unit is coupled to the filter, the driving voltage is fed back to the voltage-regulation feedback unit, the voltage-regulation feedback unit regulates the driving voltage fed back to the voltage-regulation feedback unit according to the first direct-current voltage and accordingly outputs a second direct-current voltage, the current amplification component is coupled to the voltage-regulation feedback unit and the protection device and the current amplification component performs a current amplification operation on the second direct-current voltage and accordingly outputs the driving voltage.

* * * * *